United States Patent
Wardle et al.

(10) Patent No.: US 10,018,114 B2
(45) Date of Patent: Jul. 10, 2018

(54) PRESSURE REDUCTION SYSTEM

(71) Applicant: ITM Power (Research) Limited, Sheffield, South Yorkshire (GB)

(72) Inventors: David Wardle, Sheffield (GB); Kristian Hyde, Sheffield (GB)

(73) Assignee: ITM POWER (RESEARCH) LIMITED, Sheffield, South Yorkshire (GB)

(*) Notice: Subject to any disclaimer, the term of this patent is extended or adjusted under 35 U.S.C. 154(b) by 6 days.

(21) Appl. No.: 14/905,667

(22) PCT Filed: Jul. 21, 2014

(86) PCT No.: PCT/GB2014/052229
§ 371 (c)(1),
(2) Date: Jan. 15, 2016

(87) PCT Pub. No.: WO2015/008096
PCT Pub. Date: Jan. 22, 2015

(65) Prior Publication Data
US 2016/0369692 A1  Dec. 22, 2016

(30) Foreign Application Priority Data

Jul. 19, 2013 (GB) .................................. 1312964.8
Nov. 13, 2013 (GB) .................................. 1320067.0

(51) Int. Cl.
*F02C 1/05* (2006.01)
*C25B 15/08* (2006.01)
(Continued)

(52) U.S. Cl.
CPC ................. *F02C 1/05* (2013.01); *C25B 1/04* (2013.01); *C25B 15/08* (2013.01); *F01K 25/10* (2013.01);
(Continued)

(58) Field of Classification Search
CPC ... F02C 1/05; C25B 15/08; C25B 1/04; F17D 1/07; F01K 25/10; Y02P 20/129; Y02E 60/366
(Continued)

(56) References Cited

U.S. PATENT DOCUMENTS

| 5,295,350 A | 3/1994 | Child et al. |
| 5,457,951 A | 10/1995 | Johnson et al. |

(Continued)

FOREIGN PATENT DOCUMENTS

| CN | 101701274 | 5/2010 |
| EP | 2100869 | 9/2009 |

(Continued)

OTHER PUBLICATIONS

International Search Report/Written Opinion, International Application No. PCT/GB2014/052229, PCT/ISA/210, PCT/ISA/237, dated Mar. 20, 2015.

(Continued)

*Primary Examiner* — Hoang Nguyen
(74) *Attorney, Agent, or Firm* — Saliwanchik, Lloyd & Eisenschenk

(57) ABSTRACT

A system for reducing pressure and extracting energy from natural gas pipelines or the cryogenics industry can include an electrolyzer that produces hydrogen, a heating device adapted to heat the natural gas in the pipeline, and a device adapted to extract energy from expansion of the natural gas. The extracted energy can be used to power the electrolyzer and/or heat the natural gas. The system can be used to extract energy from gas expansion.

30 Claims, 2 Drawing Sheets

Modular representation of an alternative embodiment of the proposed system

(51) Int. Cl.
*F01K 25/10* (2006.01)
*C25B 1/04* (2006.01)
*F17D 1/07* (2006.01)

(52) U.S. Cl.
CPC .............. *F17D 1/07* (2013.01); *Y02E 60/366* (2013.01); *Y02P 20/129* (2015.11)

(58) Field of Classification Search
USPC .................................. 60/649, 673, 651, 671
See application file for complete search history.

(56) References Cited

U.S. PATENT DOCUMENTS

| | | | | |
|---|---|---|---|---|
| 5,501,781 | A * | 3/1996 | Hsu | F02C 3/36 204/269 |
| 5,806,316 | A * | 9/1998 | Avakov | F01K 25/06 60/649 |
| 5,948,221 | A * | 9/1999 | Hsu | F02C 3/36 204/270 |
| 6,051,125 | A | 4/2000 | Pham et al. | |
| 8,114,363 | B1 * | 2/2012 | Golben | C10L 1/04 422/198 |
| 8,912,239 | B2 * | 12/2014 | McAlister | B01J 19/127 518/700 |
| 2002/0178724 | A1 * | 12/2002 | Hunt | B60K 3/04 60/649 |
| 2006/0236699 | A1 * | 10/2006 | Klochko | F01K 25/08 60/671 |
| 2007/0138006 | A1 * | 6/2007 | Oakes | B60L 8/00 204/278 |
| 2008/0127646 | A1 * | 6/2008 | Doland | C25B 1/04 60/641.2 |
| 2009/0322090 | A1 | 12/2009 | Wolf | |

FOREIGN PATENT DOCUMENTS

| | | |
|---|---|---|
| JP | 62-203901 | 9/1987 |
| JP | 07-506163 | 7/1995 |
| JP | 07-305637 | 11/1995 |
| JP | 2006-057141 | 3/2006 |
| JP | 2008-537058 | 9/2008 |
| RU | 2272970 C2 | 3/2006 |
| RU | 2303085 C2 | 7/2007 |
| RU | 68073 U1 | 11/2007 |
| RU | 2443935 C2 | 2/2012 |
| WO | 8604054 | 7/1986 |
| WO | 2012095636 | 7/2012 |

OTHER PUBLICATIONS

Search Report, Russian Patent and Trademark Agency, Russian Application No. 2016103927/06(006210), Form No. 18 IZ,PM-2011, dated Feb. 9, 2018.
Japanese Notice of Reasons for Rejection examination report, Japanese Patent Application No. 2016-526708, dated Apr. 25, 2018.

* cited by examiner

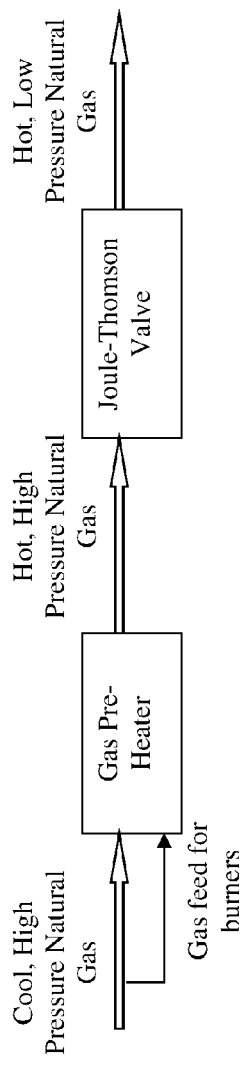
Figure 1. Modular representation of the existing system
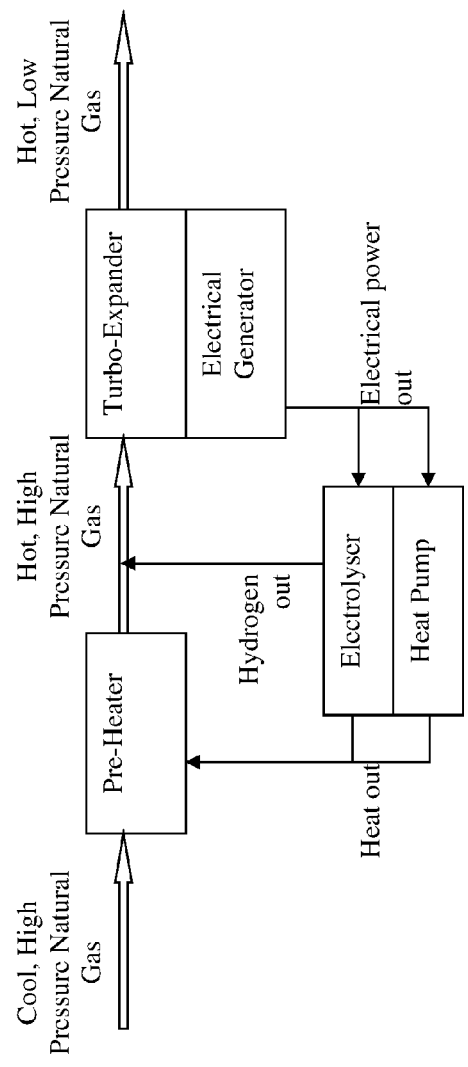
Figure 2. Modular representation of the proposed system

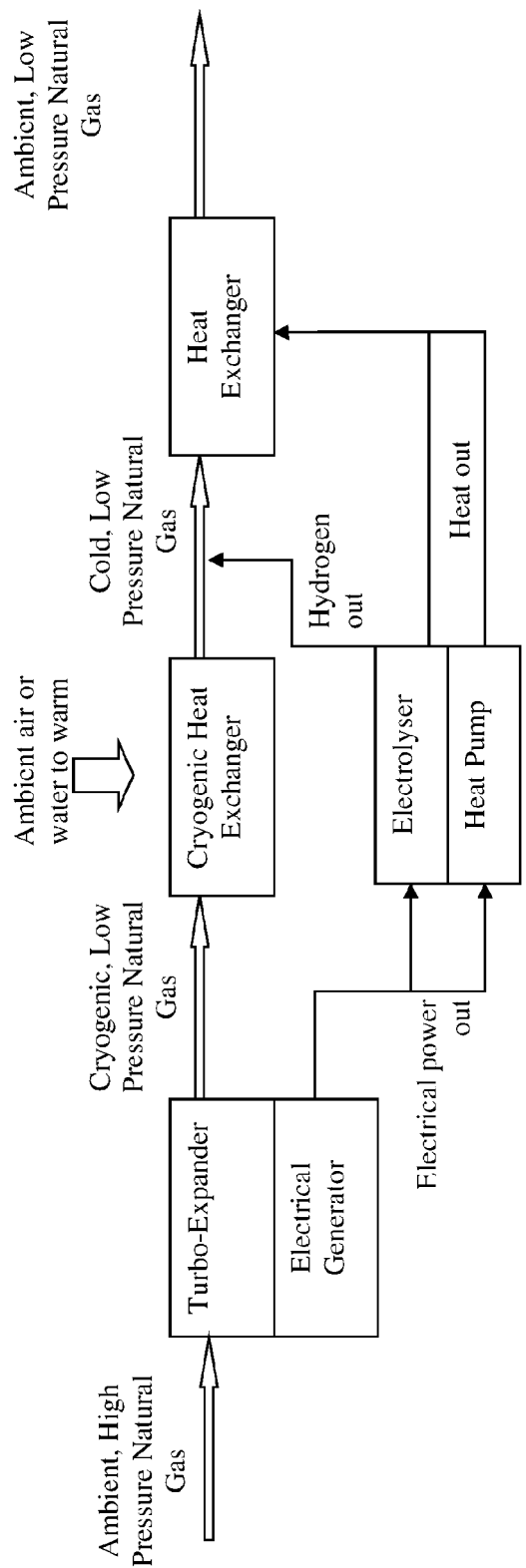
Figure 3. Modular representation of an alternative embodiment of the proposed system

PRESSURE REDUCTION SYSTEM

CROSS-REFERENCE TO RELATED APPLICATIONS

This application is a national stage application of International Patent Application No. PCT/GB2014/052229, filed Jul. 21, 2014, which claims priority to United Kingdom Application Number 1312964.8, filed Jul. 19, 2013, and United Kingdom Application Number 1320067.0, filed Nov. 13, 2013, the disclosures of each of which are incorporated herein by reference in their entirety, including any figures, tables, and drawings.

FIELD OF THE INVENTION

The present invention relates to systems for utilising the waste energy generated during pressure reduction in natural gas pipelines.

BACKGROUND OF THE INVENTION

Generally, natural gas exits gas wells at up to several hundred bar of pressure. This is regulated to be suitable for transportation in gas networks. This pressure is maintained with the aid of compressors. Therefore, the transportation system has a significant potential energy which is lost as the pressure is successively reduced within the distribution system so ensure that customers receive a suitable pressure.

Most countries use a similar system of transportation of gas across the territory, followed by regional distribution. In the UK, there are three broad groups of pressure reducing steps that take the pressure from 60-80 bar down to household mbar pressure. It is estimated that within the UK grid, there is up to 1 GW of accessible mechanical energy from gas expansion. This energy is mainly lost at Pressure Reducing Stations and there is a growing argument that the energy could and should be recovered.

It is therefore desirable to capture the mechanical (kinetic) energy that results as the gas depressurises and loses potential energy.

The incumbent pressure reduction technology involves the use of a simple orifice to reduce the pressure. This can be in the form of a modulating valve and a control system, which is commonly called a Joule Thompson valve. In gas networks, there are different names for pressure reduction. In the UK, the higher pressure systems are called pressure reduction stations (PRS), or a transmission regulator station (TRS). In the United States, the stations are called pressure letdown stations (PLS).

As the gas travels through the Joule Thompson pressure reduction valves, there is a temperature drop associated with the isenthalpic adiabatic expansion of the gas. If uncontrolled, the cold pressurised gas would allow condensation and freezing of hydrates, which can result in damaged equipment and blocked pipes. As shown in FIG. 1, this cooling presently necessitates the use of a preheating step.

Typically, the preheating technology is relatively rudimentary. It is a combustion technology, which heats a fluid in a reservoir. The gas travels through a heat exchanger in the reservoir to collect the energy. The required pre-heat depends on the initial pressure, pressure change and gas composition. For example, for typical UK natural gas composition and an input pressure of 30 bar, the temperature will fall by approximately 0.6° C. for every bar decrease in pressure. Thus, for a downstream pressure of 5 bar, a 15° C. temperature drop will be produced, which if uncontrolled will cause the output temperature to be −5° C. The amount of energy required to heat the gas is relatively small compared with the amount of chemical energy travelling in the pipe flow. However, with over 14,000 PRS within the UK, this represents a significant consumption of gas and release of $CO_2$, which is undesired.

Turbo expanders have been used for many years to recover energy from expanding gas flows. They come in a variety of sizes and efficiencies. Most use a high speed turbine, with a less common method using a positive displacement system similar to a screw-expander arrangement. By function, both have similar efficiencies (typically 30-85% isentropic efficiency) and effects on temperature and pressure. All designs can be coupled with an electrical generator to convert the expanding gas into electrical energy. The electrical power taken from the generator is then typically conditioned for use or export. By nature, turbo expanders encourage isentropic adiabatic expansion which reduces the temperature of the gas by typically 5 times more than Joule Thompson pressure reduction valves.

There appears to be several reasons why turbo expander or screw-expander technology has not been widely implemented on the gas networks:

- The electrical energy generated by a turbo expander is approximately 85% of the pre-heating requirement (although it is noted that the electricity generated is worth more per MWhr than the consumed gas).
- The increased gas consumption required for pre-heat results in an increase in the carbon footprint of the distribution system, at a time when there is considerable encouragement to decrease the carbon footprint.
- To allow the electrical energy to be exported at low cost, the PRS needs to be in close proximity to an electrical substation with sufficient generation capacity to accept the electrical input from the turbo-expander generator, significantly reducing the number of available sites.

SUMMARY OF THE INVENTION

The present invention addresses the problem of utilising the potential energy that is produced from the gas expansion (pressure reduction) stages in a gas pipeline or in the cryogenic industry. The use of turbo or screw expanders only partially addresses this problem, since the electricity produced is intermittent and often not geographically coincident with the electrical grid. Therefore it not simple to export or store the electrical energy, and is insufficient to cover the extra heating required for the pre-heating. The solutions that are proposed address that deficiency.

The present invention involves coupling a load-following electrolyser to the device that recovers energy from the gas expansion step, such as a turbo-expander. The electrolyser might be a proton exchange membrane (PEM) or an alkali based electrolyser that will convert the electricity into hydrogen. The hydrogen produced can be used in a variety of useful ways, and therefore does not suffer from the drawbacks of having to utilise the intermittent electricity and the energy can be stored indefinitely in a pressure vessel. The electrolyser also has the useful advantage of generating waste heat, which can be used in the preheating step. This has significant benefits in terms of carbon reduction.

According to a first aspect, a system for reducing pressure and extracting energy from natural gas pipelines or for use in the cryogenic industry, comprises an electrolyser that produces hydrogen, a heating device adapted to heat the natural gas in the pipeline and a device adapted to extract energy from expansion of the natural gas, wherein the extracted energy is used to power the electrolyser.

According to a second aspect, a system as defined above can be used to extract energy from gas expansion.

DESCRIPTION OF THE FIGURES

FIG. 1 shows a pressure reduction system of the prior art.

FIGS. 2 and 3 represent two preferred pressure reduction systems of the invention.

DESCRIPTION OF THE PREFERRED EMBODIMENTS

A preferred embodiment is shown in FIG. 2 and involves coupling a PEM electrolyser and heat pump to the device that recovers electrical energy from the gas expansion step, such as a turbo-expander coupled with a generator. The PEM electrolyser will ideally produce pressurised hydrogen and have the ability to load follow from 0% to 100% of rated capacity. The energy required for the gas pre-heat could come from a variety of sources including combustion. Preferably it is derived from a combination of waste heat from the electrolyser and thermal energy from the heat pump. The electrolyser converts the electricity into pressurised hydrogen gas which is preferentially injected into the natural gas grid.

The hydrogen that is produced can be used in a variety of useful ways. This arrangement therefore does not suffer from the drawbacks of exporting to the electricity grid, e.g. when there is often not enough production to meet demand.

An alternative embodiment shown in FIG. 3 is to utilise technology from the cryogenic industry (which regularly use turbo-expanders to cool gases) and feed the output of the turbo-expander directly into in a large ambient heat exchanger specifically designed to minimise the build-up hydrates, to raise the gas to near ambient temperatures. The gas can then receive a final warming through utilising the waste heat from the electrolyser and/or a heat pump as described previously.

These methodologies have significant benefits including:
In the embodiment illustrated by FIG. 2 no gas is consumed, therefore reducing the cost and carbon-footprint compared to existing Joule Thomson valves
As the hydrogen produced is 'green', its presence will act to decarbonise the gas grid for all gas consuming processes and will allow the invention to claim a range of carbon reduction incentives.
No connection to an external electrical substation is required, increasing the number of locations available and decreasing costs.

A system of the invention comprises a heater/heating device that raises the temperature of the gas. Suitable heaters will be known to those skilled in the art. The term "heating device" should be construed broadly and means any method by which the temperature of gas can be raised. For example, the heating device may be anything that enables the natural gas in the pipeline to be heated, e.g. a heat exchanger that heats gas using ambient air or water.

In a preferred embodiment, the heating device is a heat exchanger through which the natural gas flows through one half while the heating fluid is on the other half. The heating fluid may be heated by the combustion of natural gas or other fuel. The heating fluid may be heated by a combined heat and power system (CHP). The heating device may be an ambient air heat exchanger. The heating fluid may be heated by a heat pump. The heating fluid may be heated by the waste heat from the electrolyser. The heat may be provided by an electrical heater. Preferably, the heating fluid may be heated by a heat pump and waste heat from the electrolyser.

If a heat pump is used, it preferably operates with an output temperature as high as possible. Several heat pump technologies and media are possible. A preferred embodiment is a trans-critical $CO_2$ heat pump which can produce temperatures of 80-90° C. Another embodiment of a heating device is a sub-critical ammonia heat pump. Various heat sources/heating devices are possible including, but not limited to, air, ground and water. Water and air are preferred heat sources, due to lower footprint and capital expenditure costs.

Devices for extracting energy from gas expansion will be known to those skilled in the art. In the present invention, the device for extracting energy from gas expansion is preferably a turbine or a positive displacement device, such as a screw-expander. More preferably, it is a turbine, for example a turbo-expander. The device extracts kinetic energy from the gas, as it expands during depressurisation. This device is preferably mechanically coupled with either a dynamo or alternator that produces electricity. Preferably, the output is direct current (DC), and in that case, this scheme can reduce costs by eliminating AC-DC power conditioning to the electrolyser. As pressure reduction stations experience both diurnal and seasonal flow and pressure variability, all equipment connected to the generator must be able to accept a time varying input.

The electrical output from the generator may be used to power the heat pump and the electrolyser. In a preferred embodiment, the power should be dynamically split between the two devices as the input and output pressure to the turbo-expander varies, to ensure maximum hydrogen production, while providing sufficient heat for the gas pre-heat.

A system of the invention uses an electrolyser that produces hydrogen, preferably a water electrolyser. The skilled person will be able to select a suitable electrolyser for use in a system of the invention. Water electrolysers have been manufactured for many years; however, only recently has it been possible to repeatedly cycle electrolysers from 0 to 100% power range without damage.

The electrolyser may be a proton exchange membrane (PEM) electrolyser, a solid oxide electrolyser or an alkali based electrolyser, which is based on either a solid polymer or a liquid electrolyte. Preferably, the electrolyser is a PEM electrolyser. Preferably, the PEM is anionic. The membrane may be a hydrophilic cross-linked polymer. In one embodiment, the membrane is a perfluorinated polymer.

PEM technology is able to respond rapidly to fluctuating electrical inputs, without significant detriment to performance or durability. In particular hydrophilic ionic PEM membranes, such as the type described in WO03/023890, which is incorporated herein by reference in its entirety, are used in the invention. They are able to operate over a wide current range, preferably 0.1-3 $A/cm^2$, which is significantly higher than alkaline liquid electrolysers. The increased current density results in a smaller electrolyser requirement and therefore is beneficial in both footprint and cost.

The oxygen produced by electrolysis may be vented, used or stored. It may be used to improve the combustion properties of additional equipment. The oxygen may be used in a combustion reaction to heat the gas in the pipeline and/or transmitted to the heating device for use in said device. The oxygen may be pre-heated prior to combustion or transmittal to the heating device.

An electrolyser for use in the invention should generate hydrogen at pressures greater than 1 bar. The hydrogen output from the electrolyser may be pressurised by a compressor. Preferably, the electrolyser should generate hydrogen at a pressure that allows direct injection in to the natural gas pipe without the requirement of a compressor.

A mechanism of hydrogen storage may be required to allow the electrolyser output to be buffered. Several storage technologies are possible including compressed gas and metal hydride. The preferred embodiment is compressed gas.

The gas may be heated before or after it enters the device for extracting energy.

The gas may be heated by either:
a) a heat pump;
b) waste heat from the electrolyser;
c) waste heat from the device for extracting energy from gas expansion;
d) energy derived from the combustion of natural gas
e) energy derived from a combined heat and power plant; and/or
f) a combination of two or more of the above.

In the UK, mixing and dilution of the hydrogen within the gas pipeline should be demonstrated. This may be achieved by a mixing device before injection into the natural gas pipeline, such as a static mixer. Alternatively, dilution may be achieved through turbulence in the gas pipeline. Hydrogen may be introduced into the high-pressure side before the device that extracts energy from gas expansion, in which case, the lowering of pressure produces the required turbulence for mixing. Preferably, the hydrogen gas is introduced into the low pressure side after the device that extracts energy from gas expansion, the downstream turbulence from the device provides the mixing of the two gases. Measurements may be required downstream and upstream of the pressure reduction station to meet legal requirements. This may include, but is not limited to, flow rate, pressure, Wobbe, calorific value and hydrogen content.

Rather than return the hydrogen gas to the natural gas grid, it may be diverted for use in other applications where a higher price could be achieved for the gas. For example, it may be stored for use in transport applications (as a fuel), or it may also be used in as a reactant in a chemical reaction, such as ammonia production, methanation, liquid fuel synthesis and/or oxygen applications.

The two preferred embodiments as shown in FIGS. 2 and 3 will be discussed in more detail below.

Embodiment 1

This technology replaces the existing static expansion valve (Joule Thomson) systems with an integrated gas preheating, energy recovery system, heat pump and hydrogen electrolysis equipment package. The system will preheat the natural gas, extract energy during depressurisation and use that energy to power a heat pump and electrolyser. Heat from the electrolyser and heat pump will provide the energy for pre-heat while the electrolyser will generate low carbon hydrogen gas. This can be immediately injected into the gas grid lowering the carbon footprint of the gas. A schematic diagram of a system of the invention is shown in FIG. 2 as "proposed system".

Embodiment 2

This technology replaces the existing static expansion valve (Joule Thomson) systems with an energy recovery system, cryogenic heat exchanger, heat pump and hydrogen electrolysis equipment package.

The system extracts energy during depressurisation and then uses that energy to power a heat pump (the heating device) and electrolyser. The cryogenically cooled natural gas will then enter a heat exchanger to be warmed by atmospheric air. Heat from the electrolyser and heat pump will provide any additional energy required for the gas to be allowed into the gas system. The electrolyser will generate 'green' hydrogen gas. This can be immediately injected into the gas grid lowering the carbon footprint of the gas. A schematic diagram of a system of the invention is shown in FIG. 3 as "proposed system".

Following expansion, the gas enters an ambient air heat exchanger. This may be specifically designed for cryogenic gases and transfers heat from the air. Typically there will be two parallel systems that are cycled to defrost ice that builds up on the system. This will provide the majority of the heat. There may be times on cold days, for instance, when further heating will be required. This will preferably be provided by a variety of sources including air, ground or water heat pump, electrical heating, waste heat from a CHP plant or traditional combustion processes. More preferably, it is heated by air or flowing water using a heap pump.

The electrical output from the generator should be used to power an electrolyser. The waste heat from the electrolyser is preferably used to provide additional heating to the natural gas via a heat exchanger. If this is insufficient, a heat pump may also be powered from the generator and its output used to further warm the natural gas via a heat exchanger. In a preferred embodiment, the power from the generator is preferably dynamically split between the two devices as the input and output pressure to the turbo-expander varies, to ensure maximum hydrogen production, while providing sufficient heat for the gas.

A mechanism of hydrogen storage may be required to allow the electrolyser output to be buffered. Several storage technologies are possible including compressed gas and metal hydride. The preferred embodiment is compressed gas.

In a further aspect of the invention, an electrolyser that produces hydrogen and oxygen, is suitable for attachment to a natural gas pipeline, and adapted to be powered by energy obtained from expansion of the natural gas in the pipeline.

The following example illustrates the invention.

Example 1

This example is a mid-size pressure reduction station carrying natural gas. The amount of gas is 15840 m$^3$ per hour with an inlet temperature of 10° C. Inlet pressure is 70 bara and outlet pressure is 30 bara.

In a typical existing system using Joule Thomson technology the gas would be heated by 24° C. so that it would reach the pressure reduction valve at 34° C. Pressure reduction valve would reduce the temperature by 24° C. and it would exit the valve at 10° C. The amount of heat required to raise that gas by 24° C. is 160 kW. Given heat exchanger and burner inefficiencies, this requires 197 kW (chemical) of methane. Assuming a wholesale price of £0.02/kWhr, this implies an annual OpEx of £35 k and will produce 342 t $CO_2$.

This system is replaced by a system of the invention (same flow rate, input pressure and output pressure). At typical UK gas composition and 30 bar output pressure, our model indicates that hydrates may start formation at 8.8° C. Therefore for safety, the output temperature should be kept 5° C. above this level; therefore the gas output temp is 13.8° C.

The incoming gas is preheated by 69.2° C. to provide an inlet temperature to the turbo expander of 79.2° C. This requires 461 kW of heat to the gas, which due to heat exchanger inefficiencies will require 512 kW of heat input.

The gas then enters the turbo expander where 262 kW of energy is extracted as electricity. The gas is then chilled back down to 13.8° C.

The trans-critical $CO_2$ air source heat pump (ASHP) consumes 262 kW and produces 485 kW of heat. The electrolyser consumes 89 kW and produces 27 kW of heat, assuming 70% efficiency (total heat produced=512 kW).

The electrolyser generates 195 $Nm^3$/day of $O_2$ and 390 $Nm^3$/day of $H_2$, which is equivalent to 0.1% of the gas flow—which is the UK legal limit for hydrogen concentration in the gas network.

This system generates £106 k pa of Renewable Heat Incentives (RHI) payments, £96 k pa of Renewable Obligation Certificates (ROC) payments and £10 k through the sale of hydrogen, providing a total income of £214 k pa; this is compared to the £35 k pa loss associated with having a traditional Joule Thomson technology. This represents a saving of £248 k pa (all prices correct as of September 2013). By injecting zero carbon $H_2$ in the gas pipe and diluting the natural gas, 108 t pa of carbon is saved. Thus compared to existing Joule Thomson technology, 450 t pa of carbon is saved.

The invention claimed is:

1. A system for reducing pressure and extracting energy from natural gas pipelines or for use in the cryogenic industry, the system comprising:
   an electrolyser that produces hydrogen;
   a first heat pump;
   a heating device adapted to heat the natural gas in the pipeline; and
   a device adapted to extract energy from expansion of the natural gas,
   wherein the extracted energy is used to power the electrolyser and the first heat pump, and
   wherein the heating device derives its energy from the first heat pump and the electrolyser.

2. The system according to claim 1, wherein the heating device is a second heat pump.

3. The system according to claim 2, wherein the heating device is a transcritical $CO_2$ heat pump or a subcritical ammonia heat pump.

4. The system according to claim 1, wherein the heating device is a heat exchanger.

5. The system according to claim 1, wherein the heating device is adapted to heat the natural gas using heat energy from the air, ground or a water source.

6. The system according to claim 1, wherein the device for extracting energy from gas expansion is a turbine expander.

7. The system according to claim 1, wherein the device for extracting energy from gas expansion is a screw expander.

8. The system according to claim 1, wherein the gas is preheated before it enters the device for extracting energy.

9. The system according to claim 1, wherein the gas is heated after it exits the device for extracting energy.

10. The system according to claim 8, wherein in addition to the energy derived from the heat pump and the electrolyser, the gas is heated by:
   a) waste heat from the device for extracting energy from gas expansion;
   b) energy derived from the combustion of natural gas; and/or
   c) energy derived from a combined heat and power plant.

11. The system according to claim 1, wherein the electrolyser is a proton exchange electrolyser.

12. The system according to claim 1, wherein the electrolyser is anionic.

13. The system according to claim 12, wherein the electrolyser is a liquid alkaline electrolyser.

14. The system according to claim 12, wherein the electrolyser is a solid polymer alkaline electrolyser.

15. The system according to claim 11, wherein the electrolyser membrane is a hydrophilic cross-linked polymer.

16. The system according to claim 11, wherein the electrolyser membrane is a perfluorinated polymer.

17. The system according to claim 1, wherein the electrolyser generates the hydrogen at pressures greater than 1 bar.

18. The system according to claim 1, wherein the hydrogen produced by the electrolyser is pressurised by a compressor.

19. The system according to claim 1, wherein the hydrogen produced by the electrolyser is injected into the gas pipeline.

20. The system according to claim 1, further comprising a gas mixing apparatus adapted to mix the hydrogen from the electrolyser with the natural gas in the pipeline.

21. The system according to claim 20, configured such that the mixed gas is injected into the gas pipeline.

22. The system according to claim 19, configured such that the gas enters the pipeline prior to the device that extracts energy from the depressurising gas.

23. The system according to claim 19, configured such that the gas enters the mixing apparatus after the device that extracts energy from the depressurising gas.

24. The system according to claim 19, configured such that the oxygen produced by the electrolyser is used in combustion to heat the gas and/or is used in the heating device.

25. The system according to claim 24, configured such that the oxygen is preheated prior to combustion.

26. A method of extracting energy from gas expansion, comprising using the system according to claim 1 to extract energy from gas expansion.

27. The method according to claim 26, wherein the equipment for extracting energy from the depressurising natural gas is a turbo expander.

28. The method according to claim 26, wherein the equipment for extracting energy from the depressurising natural gas is a screw expander.

29. The method according to claim 26, wherein the equipment for extracting energy is connected to equipment to convert that energy into electrical power.

30. The method according to claim 29, wherein the energy is used to power at least one of the electrolyser, gas heating equipment, and ancillary equipment on site.

* * * * *